(12) United States Patent
Jiang et al.

(10) Patent No.: US 8,391,168 B2
(45) Date of Patent: Mar. 5, 2013

(54) AUTOMATICALLY DISCOVERING ARCHITECTURAL ROLES OF PACKET SWITCHING DEVICES

(75) Inventors: Shun Jiang, San Jose, CA (US); Ping Wang, San Jose, CA (US); Alok Verma, Fremont, CA (US)

(73) Assignee: Cisco Technology, Inc.

( * ) Notice: Subject to any disclaimer, the term of this patent is extended or adjusted under 35 U.S.C. 154(b) by 530 days.

(21) Appl. No.: 11/724,145

(22) Filed: Mar. 14, 2007

(65) Prior Publication Data

US 2008/0225754 A1 Sep. 18, 2008

(51) Int. Cl.
 H04L 12/28 (2006.01)
(52) U.S. Cl. ........................... 370/252; 370/255
(58) Field of Classification Search .................. 370/254, 370/255, 400, 401, 406, 901, 902, 912, 252; 709/223, 224, 249
See application file for complete search history.

(56) References Cited

U.S. PATENT DOCUMENTS

| | | | | |
|---|---|---|---|---|
| 6,678,835 B1 * | 1/2004 | Shah et al. | ........................ | 714/4 |
| 6,708,187 B1 * | 3/2004 | Shanumgam et al. | ......... | 707/201 |
| 6,944,183 B1 * | 9/2005 | Iyer et al. | ...................... | 370/466 |
| 7,032,022 B1 * | 4/2006 | Shanumgam et al. | ........ | 709/225 |
| 7,099,947 B1 * | 8/2006 | Nadeau et al. | ................ | 709/229 |
| 7,420,933 B2 * | 9/2008 | Booth et al. | ................... | 370/254 |
| 7,631,059 B2 * | 12/2009 | Chang et al. | ................... | 709/223 |
| 7,769,037 B2 * | 8/2010 | Booth et al. | ................... | 370/419 |
| 7,818,409 B2 * | 10/2010 | Chandrashekhar et al. | .. | 709/223 |
| 7,957,280 B2 * | 6/2011 | Cohen et al. | ................... | 370/230 |
| 2002/0157018 A1 * | 10/2002 | Syvanne | ....................... | 713/200 |
| 2003/0142674 A1 * | 7/2003 | Casey | ......................... | 370/393 |
| 2005/0193103 A1 * | 9/2005 | Drabik | .......................... | 709/221 |
| 2006/0187854 A1 * | 8/2006 | Booth et al. | ................... | 370/254 |

OTHER PUBLICATIONS

Anderson et al., "Provider Provisioned Virtual Private Network (VPN) Terminology", RFC 4026, Mar. 2005, Internet Engineering Task Force.
Chamas et al., "Verizon Experience with NG Ethernet Services: Evolution to a Converged Layer 1, 2 Network", Communications Magazine, IEEE vol. 43, Issue 8, Aug. 2005, pp. s18-s25.
Louati et al., "Network-Based Virtual Personal Overlay Networks Using Programmable Virtual Routers", Communications Magazine, IEEE vol. 43, Issue 8, Aug. 2005, pp. 86-94.
Manousakis et al., "Network and Domain Autoconfiguration: A Unified Approach for Large Dynamic Networks", Communications Magazine, IEEE vol. 43, Issue 8, Aug. 2005, pp. 78-85.
"Modifying, Downloading, and Maintaining Configuration Files," Cisco IOS Configuration Fundamentals Configuration Guide, Release 12.1, Cisco Systems, Inc., Jun. 6, 2002 (28 pages).

* cited by examiner

*Primary Examiner* — Dang Ton
*Assistant Examiner* — Brian O Connor
(74) *Attorney, Agent, or Firm* — The Law Office of Kirk D. Williams (57) ABSTRACT

Network architectural roles of packet switching devices are automatically determined by retrieving and analyzing configuration information of the packet switching devices. The retrieved configuration information typically includes operational details of the packet switching operations performed by the packet switching device, with these retrieved operational details being analyzed in order to identify one or more network architectural roles being performed by a particular packet switching device. Examples of such identified network architectural role include, but are not limited to, a customer edge device, a provider edge device, and a user-facing provider edge device. Knowing the architectural role performed by a packet switching device is useful for operations, administration, maintenance and provisioning of networks of these packet switching devices.

22 Claims, 7 Drawing Sheets

METRO ETHERNET
EXAMPLE LOGICAL
TOPOLOGY

FIGURE 1A

L3 MPLS
EXAMPLE LOGICAL TOPOLOGY
FIGURE 1B

ATOMIC RULE DEFINITIONS:
(The quoted expressions below include keywords identifying operational details of a packet switching device extracted from configuration information of the packet switching device.)

501

ACCESS_PORT -- "switchport mode access" && "switchport access vlan <vlan*>"
QINQ_PORT -- "switchport mode dot1q-tunnel"
TRUNK_PORT -- "switchport mode trunk" && "switchport trunk encapsulation do1q"
CDP -- "no cdp enable"
TRUNK_VLANS -- "switchport trunk allow vlan <vlan*>"
PORT_SECURITY -- "switchport port-security"
EOMPLS -- "xconnect"
VPLS -- "l2 vrf"
MPLS_VPN -- "ip vrf" and "rd"
MPLS -- "tag-switching ip" || "mpls ip"
CEF -- "ip cef"
MP-BGP -- "address-family ipv4 vrf" && "address-family vpnv4"

COMPOUND RULE DEFINITIONS:
(complex logical combination of atomic rules)

502

U-PE -- ACCESS_PORT || QINQ_PORT || (TRUNK_PORT && (CDP || TRUNK_VLANS || PORT_SECURITY))
N-PE -- EOMPLS || VPLS
N-PE/PE -- (MPLS_VPN && MPLS && MP-BGP)
P -- MPLS && CEF && (! MPLS_VPN)
MVRFCE -- MPLS_VPN && CEF && (! MPLS) && (! MP-BGP)

AUTOMATICALLY DISCOVERING ARCHITECTURAL ROLES OF PACKET SWITCHING DEVICES

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

These networks can be quite complex in terms of their physical topology as well as their logical connectivity and service offerings. Within these networks, a packet switching device may be identified as performing one or more architectural roles, such as, but not limited to, being a core, aggregation or access packet switching device. RFC 4026, entitled "Provider Provisioned VPN Terminology," March 2005, (which is hereby incorporated by reference in its entirety) is available from the Internet Engineering Task Force (at ietf.org) and is a good introductory source for understanding various architectural roles that a packet switching device might perform in a network.

The architectural role(s) that a packet switching device performs typically depends on the design of the network and the device's location in the network. Understanding what architectural role a device plays is important for network management and/or other operations, maintenance, management, and provisioning systems. Prior systems require a human to manually specify the architectural role(s) that a packet switching device is performing, which can be a tedious and error-prone process.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-readable media, mechanisms, and means for automatically discovering architectural roles of packet switching devices (e.g., routers, bridges, switches, etc.).

One embodiment includes a computer-implemented method of automatically discovering network architectural roles of packet switching devices. One embodiment, for each particular packet switching device of one or more packet switching devices, retrieves configuration information of the particular packet switching device and then analyzes this retrieved configuration information to identify the architectural role(s) for which the packet switching device is configured to perform. In one embodiment, this retrieved configuration information includes operational details of the packet switching operations performed by the particular packet switching device, with these retrieved operational details being analyzed in order to identify one or more network architectural roles being performed by the particular packet switching device.

In one embodiment, the identified network architectural role includes a customer edge device. In one embodiment, the identified network architectural role includes a provider edge device. In one embodiment, the identified network architectural role includes a user-facing provider edge device. In one embodiment, the identified network architectural role includes a network-facing provider edge device. In one embodiment, the network architectural roles for at least one of the packet switching devices includes at least two different network architectural roles. In one embodiment, these at least two different network architectural roles include a network-facing provider edge device and a user-facing provider edge device.

One embodiment includes tangibly storing in a tangible computer-readable medium a representation of each identified network architectural role for each particular packet switching device.

In one embodiment, the operation of analyzing the retrieved operational details includes parsing the configuration information to determine keywords identifying the operational details and identifying the network architectural roles based on whether or not the identified keywords match predetermined rules or values.

In one embodiment, a metro Ethernet network includes the packet switching devices; and wherein the identification of the network architectural roles for the packet switching devices includes: identification of at least one packet switching device of the packet switching devices as a provider core device, identification of at least one packet switching device of the packet switching devices as a network-facing provider edge device, and identification of at least one packet switching device of the packet switching devices as a user-facing provider edge device.

In one embodiment, a network includes the packet switching devices; wherein the operation of retrieving configuration information includes remotely retrieving the configuration information.

2. Description

Disclosed are, inter alia, methods, apparatus, computer-readable media, mechanisms, and means for automatically discovering architectural roles of packet switching devices. Automatically discovering the architectural roles of packet switching devices reduces the error prone nature induced by prior approaches requiring manual entry of information.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" may include computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-readable media, mechanisms, and means for automatically discovering architectural roles of packet switching devices. For example, a packet switching device may be identified as performing one or more architectural roles, such as, but not limited to, being a core, aggregation or access packet switching device (e.g., a router or a bridge/switch). It is important for operations, administration, management, and provisioning to understand the architectural role being performed by a packet switching device. For example, the architectural role(s) performed by a packet switching device typically define the information required to be stored in a device for forwarding packets and what processing is to be performed by the packet switching device. For example, a provider core router (P) does not need to keep virtual network state information, while other packet switching devices may need this information.

One embodiment includes a computer-implemented method of automatically discovering network architectural roles of packet switching devices. One embodiment, for each particular packet switching device of one or more packet switching devices, retrieves configuration information of the particular packet switching device and then analyzes this retrieved configuration information to identify the architectural role(s) for which the packet switching device is configured to perform. In one embodiment, this retrieved configuration information includes operational details of the packet switching operations performed by the particular packet switching device, with these retrieved operational details being analyzed in order to identify one or more network architectural roles being performed by the particular packet switching device.

In one embodiment, the identified network architectural role includes a customer edge device. In one embodiment, the identified network architectural role includes a provider edge device. In one embodiment, the identified network architectural role includes a user-facing provider edge device. In one embodiment, the identified network architectural role includes a network-facing provider edge device. In one embodiment, the network architectural roles for at least one of the packet switching devices includes at least two different network architectural roles. In one embodiment, these at least two different network architectural roles include a network-facing provider edge device and a user-facing provider edge device.

One embodiment includes tangibly storing in a tangible computer-readable medium a representation of each identified network architectural role for each particular packet switching device.

In one embodiment, the operation of analyzing the retrieved operational details includes parsing the configuration information to determine keywords identifying the operational details and identifying the network architectural roles based on whether or not the identified keywords match predetermined rules or values.

In one embodiment, a metro Ethernet network includes the packet switching devices; and wherein the identification of the network architectural roles for the packet switching devices includes: identification of at least one packet switching device of the packet switching devices as a provider core device, identification of at least one packet switching device of the packet switching devices as a network-facing provider edge device, and identification of at least one packet switching device of the packet switching devices as a user-facing provider edge device.

In one embodiment, a network includes the packet switching devices; and wherein the operation of retrieving configuration information includes remotely retrieving the configuration information.

One embodiment includes an apparatus that can be used for some managing functions of a network including multiple packet switching devices. The apparatus comprises one or more processors and a memory, wherein the memory stores one or more instructions that, when executed by the one or more processors, perform operations to automatically discover network architectural roles of each particular packet switching device. In one embodiment, the operations for automatically discovering one or more network architectural roles for each particular packet switching device includes: retrieving configuration information of the particular packet switching device, with this retrieved configuration information identifying operational details of the packet switching operations performed by the particular packet switching device; and analyzing the retrieved operational details in order to identify one or more network architectural roles being performed by the particular packet switching device.

In one embodiment, the identified network architectural role(s) for a particular packet switching device may include, but is not limited to, one or more of the following extensible set of types including: a customer edge device, a provider edge device, a user-facing provider edge device, a network-facing provider edge device, a provider edge aggregation device, a provider core device, or a Multi-VPN routing and forwarding customer edge device. In one embodiment, the identified network architectural roles for a particular packet switching device includes at least two different network architectural roles. In one embodiment, these at least two different network architectural roles includes a network-facing provider edge device and a user-facing provider edge device.

In one embodiment, the operation of analyzing said retrieved operational details includes parsing said configuration information to determine keywords identifying said operational details and identifying said network architectural roles based on whether or not said identified keywords match predetermined rules or values. One embodiment stores the identified one or more network architectural roles for said particular packet switching in a computer-readable medium.

One embodiment includes an apparatus for automatically discovering network architectural roles of each particular packet switching device of one or more packet switching devices, the apparatus comprising: means for retrieving configuration information of said particular packet switching device, said retrieved configuration information identifying operational details of the packet switching operations performed by said particular packet switching device; and means for analyzing said retrieved operational details to identify one or more network architectural roles being performed by said particular packet switching device.

In one embodiment, said identified one or more network architectural roles for said particular packet switching device includes one or more architectural roles from a set of architectural roles including: a customer edge device, a provider edge device, a user-facing provider edge device, and a network-facing provider edge device. In one embodiment, said means for analyzing said retrieved operational details includes means for parsing said configuration information to determine keywords identifying said operational details and identifying said network architectural roles based on whether or not said identified keywords match predetermined rules or values. In one embodiment, a network includes said packet switching devices; and wherein said means for retrieving configuration information includes means for remotely retrieving said configuration information.

A customer edge (CE) packet switching device is the name of the packet switching device located on the customer premises and interfacing a network provider's network. A provider edge (PE) packet switching device is the name of the packet switching device located in a network provider's network which interfaces the customer premises packet switching devices. A network facing provider edge (N-PE) packet switching device refers to a provider edge (PE) packet switching device which includes the signaling and control functions. A user-facing provider edge (U-PE) packet switching device refers to a provider edge (PE) packet switching device which includes the functions needed to make forwarding or switching decisions at the ingress of the provider network. A provider or core packet switching device is a packet switching device in the provider's core network that does not have interfaces directly toward a customer.

Figure 1A:
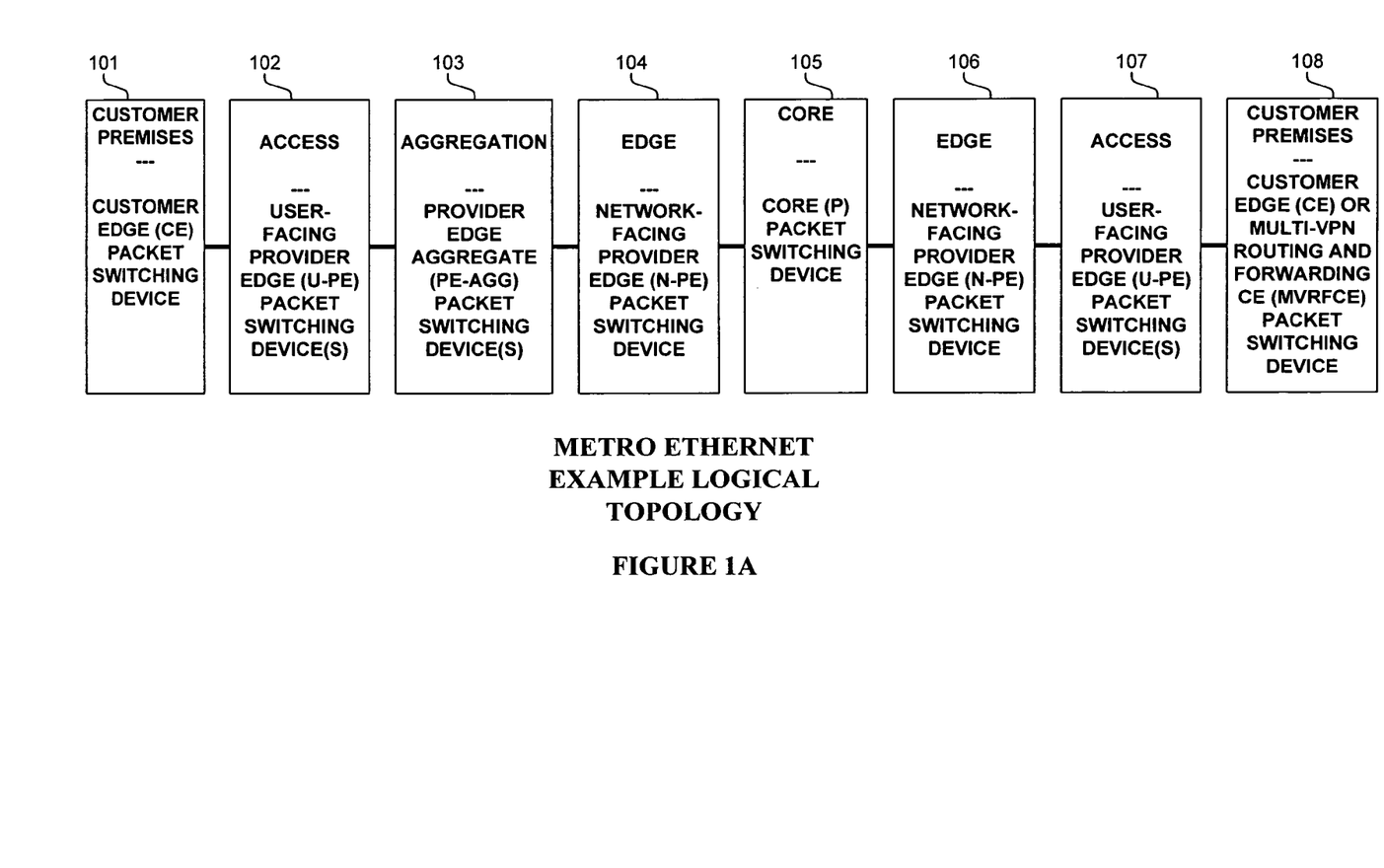
FIG. 1A illustrates an example network configuration useful for explaining the operation of one embodiment.

FIG. 1A illustrates an example Metro Ethernet service offering, which typically uses a hierarchy of packet switching devices to provide service to its customers with some of these packet switching devices performing different architectural roles. Illustrated in FIG. 1A is one such relationship, which includes the following devices communicatively coupled as shown:

- a customer edge (CE) packet switching device 101;
- a user-facing provider edge (U-PE) packet switching device 102;
- a provider edge aggregate (PE-AGG) packet switching device 103;
- a network-facing provider edge (N-PE) packet switching device 104;
- a core (P) packet switching device 105;
- a network facing provider edge (N-PE) packet switching device 106;
- a user-facing provider edge (U-PE) packet switching device 107; and
- a customer edge (CE) or Multi-VPN routing and forwarding CE (MVRFCE) packet switching device 108.

Figure 1B:
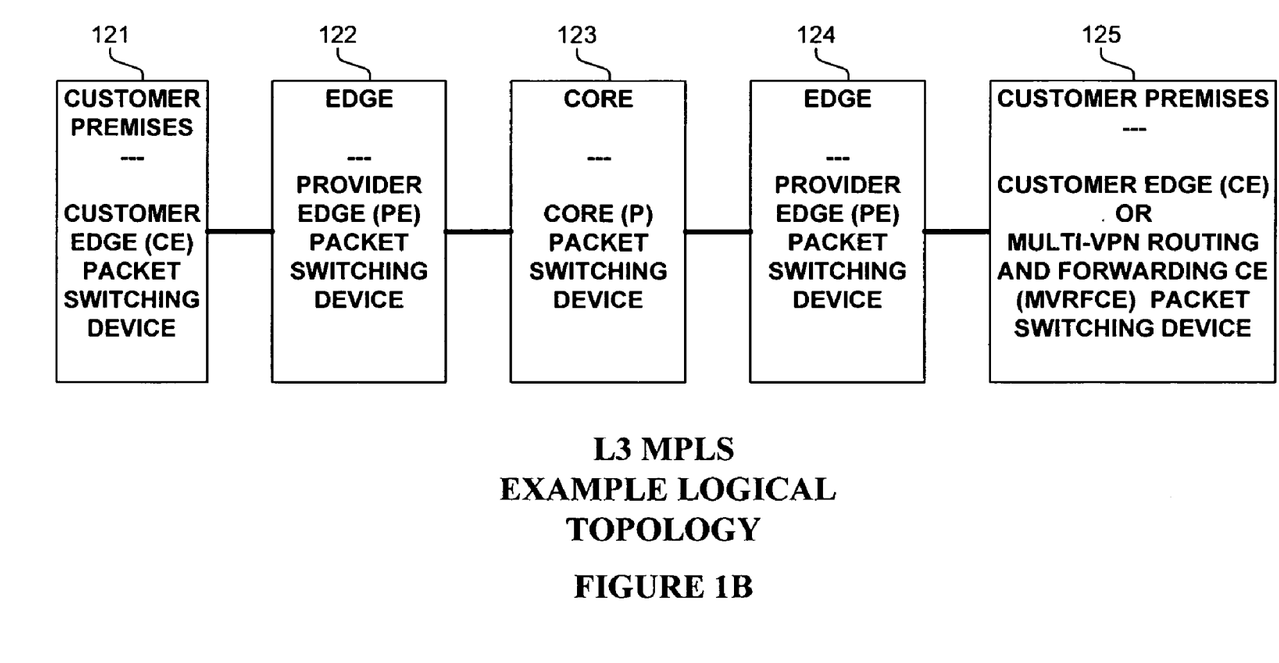
FIG. 1B illustrates an example network configuration useful for explaining the operation of one embodiment.

FIG. 1B illustrates an example L3 MPLS VPN service offering, which typically uses a hierarchy of packet switching devices to provide service to its customers, with some of these packet switching devices performing different architectural roles. Illustrated in FIG. 1B is one such relationship, which includes the following devices communicatively coupled as shown:

- a customer edge (CE) packet switching device 121;
- a provider edge (PE) packet switching device 122;
- a core (P) packet switching device 123;
- a provider edge (PE) packet switching device 124;
- a customer edge (CE) or Multi-VPN routing and forwarding CE (MVRFCE) packet switching device 125.

Figure 2:
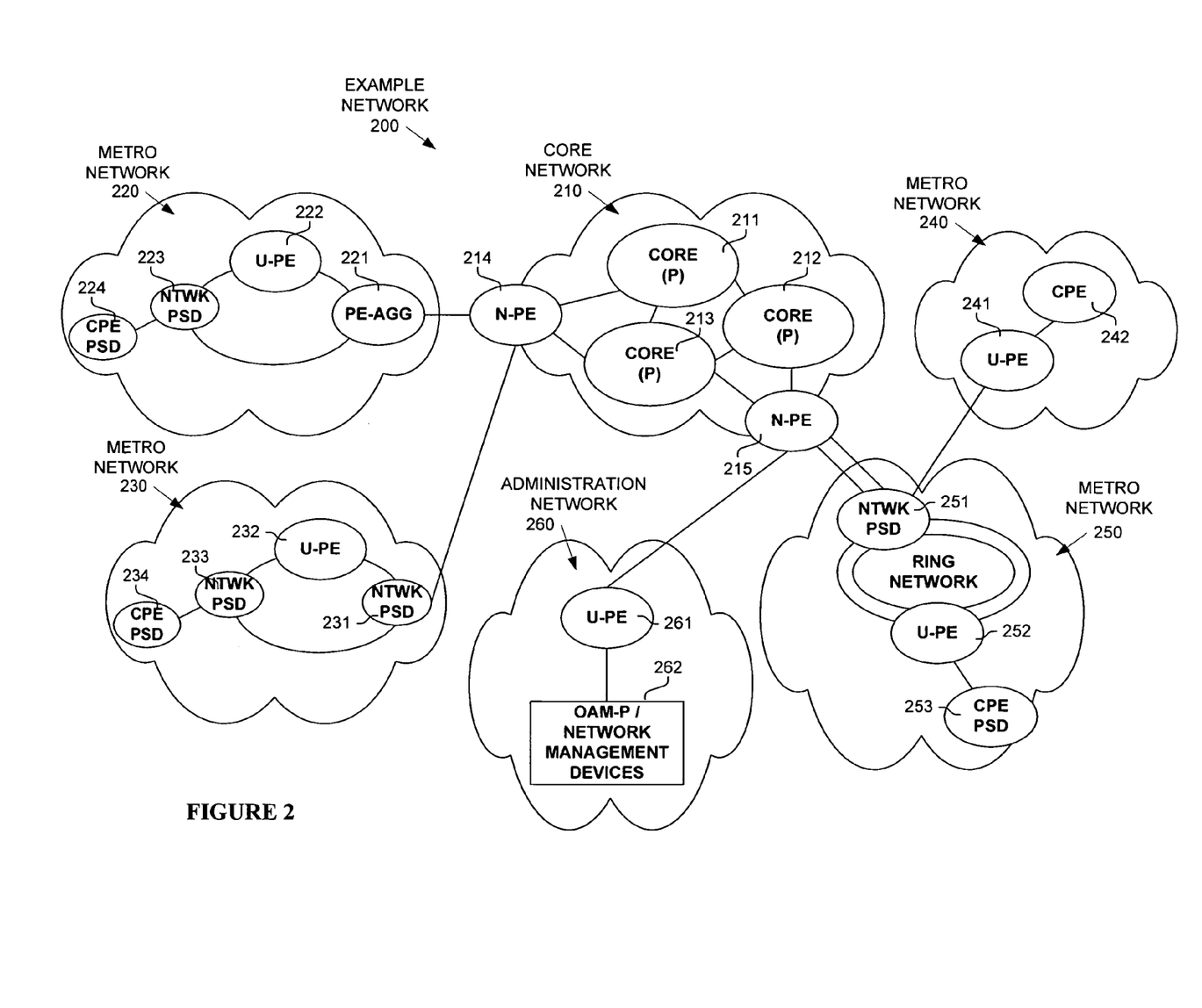
FIG. 2 illustrates an example network configuration useful for explaining the operation of one embodiment.

FIG. 2 illustrates an example network 200, which uses a hierarchy of packet switching devices to provide service to its customers, with some of these packet switching devices performing different architectural roles. As shown, this example network (200) includes a core network 210, and four Metro networks 220, 230, 240, and 250. Network 200 also includes an administrative network 260 which includes user-facing provider edge (U-PE) packet switching device 261 and one or more operations, administration, maintenance, and provisioning (OAM-P) (i.e., including network management functionality) devices/computers 262 for provisioning and maintaining the network.

Of course, network 200 is just one example network, but its configuration shows connectivity using devices performing different architectural roles. As shown, core network 210 includes three core packet switching devices 211-213 and two network-facing provider edge (N-PE) packet switching devices 214 and 215. Metro network 220 includes a provider edge aggregate (PE-AGG) packet switching device 221, a user-facing provider edge (U-PE) packet switching device 222, a network packet switching device (NTWK PSD) 223, and a customer premises packet switching device (CPE PSD) 224. Metro network 230 includes a network packet switching device (NTWK PSD) 231, a user-facing provider edge (U-PE) packet switching device 232, a network packet switching device (NTWK PSD) 233, and a customer premises packet switching device (CPE PSD) 234. Metro network 240 includes a user-facing provider edge (U-PE) packet switching device 241 and a customer premises packet switching device (CPE PSD) 242. Metro network 250 includes a network packet switching device (NTWK PSD) 251, a user-facing provider edge (U-PE) packet switching device 252, and a customer premises packet switching device (CPE PSD) 234.

Figure 3:
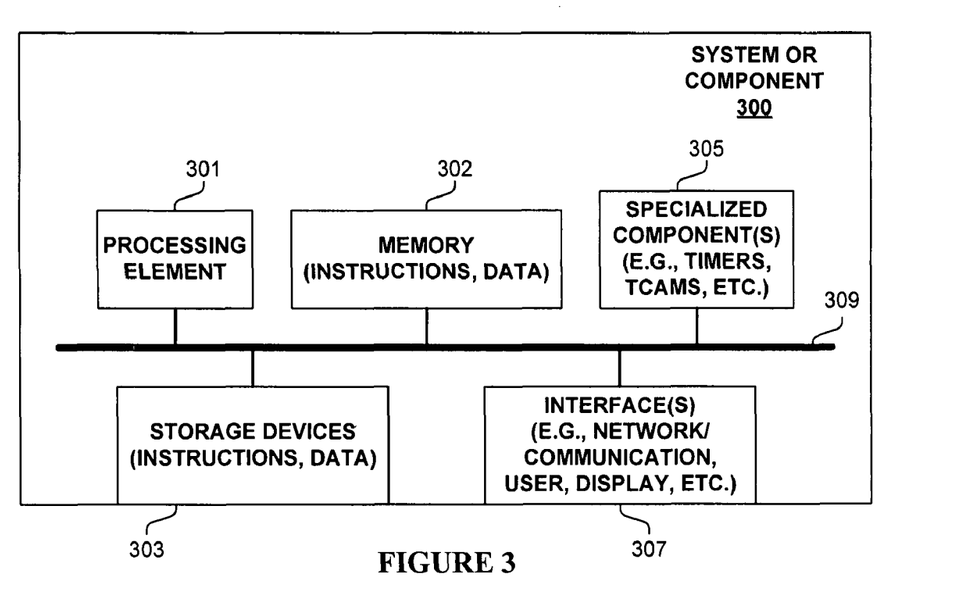
FIG. 3 illustrates an example system or component used in one embodiment.

FIG. 3 is block diagram of a system or component 300 used in one embodiment for automatically discovering architectural roles of packet switching devices. In one embodiment, system or component 300 performs one or more processes corresponding to one of the flow diagrams illustrated or otherwise described herein.

In one embodiment, system or component 300 includes a processing element 301, memory 302, storage devices 303, specialized components 305 (e.g. optimized hardware, etc.), and one or more interfaces 307 (e.g., network/communication interfaces for sending and receiving packets, user interfaces/displays, etc.), which are typically communicatively coupled via one or more communications mechanisms 309, with the communications paths typically tailored to meet the needs of the application.

Various embodiments of component 300 may include more or less elements. The operation of component 300 is typically controlled by processing element 301 using memory 302 and storage devices 303 to perform one or more tasks or processes. Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

Figure 4:
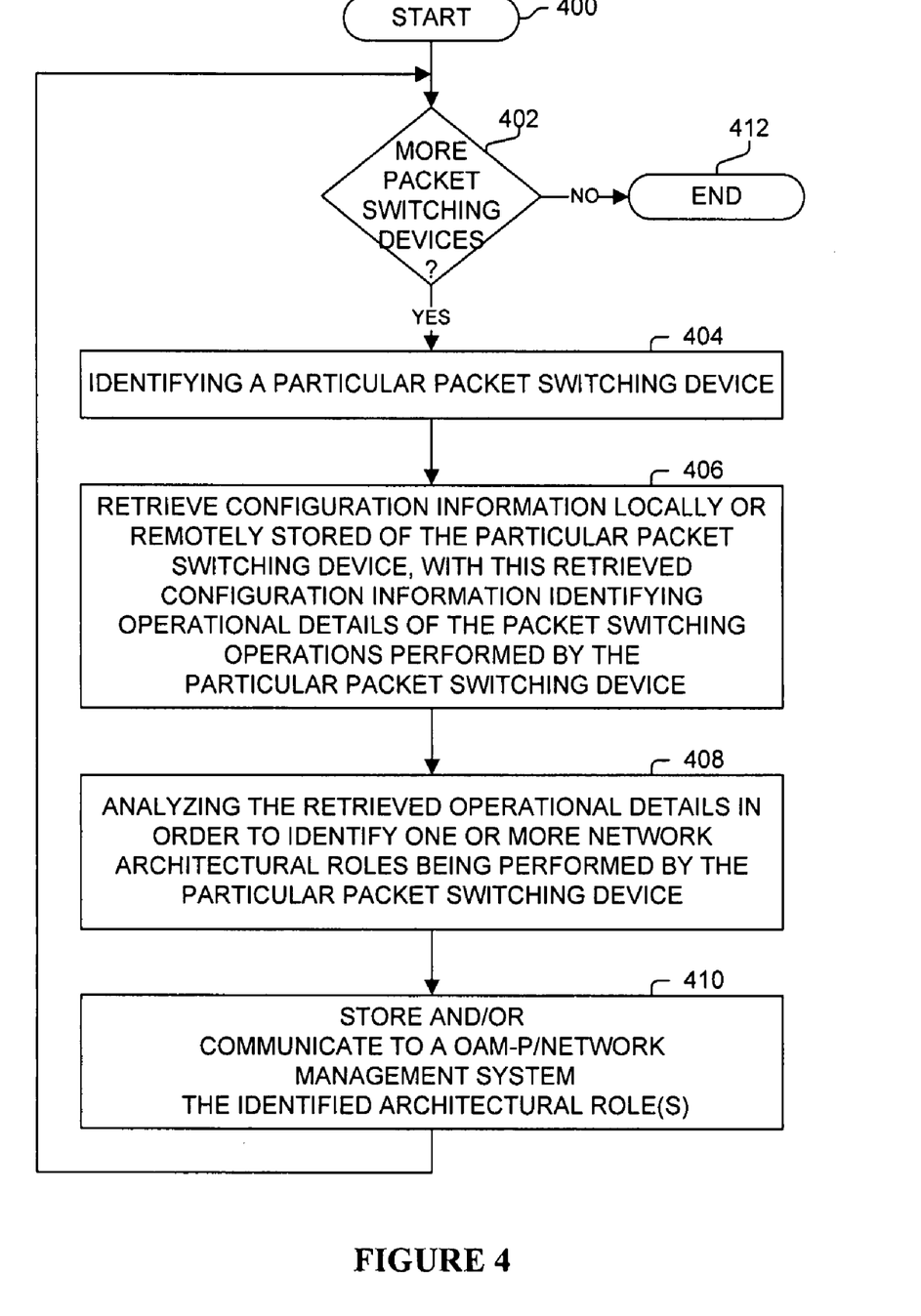
FIG. 4 illustrates a process used in one embodiment for automatically determining an architectural role of a packet switching device.

FIG. 4 illustrates a process used in one embodiment for automatically determining an architectural role of a packet switching device. Processing begins with process block 400. While there are one or more packet switching devices for which to determine their architectural roles, process blocks 404-410 are performed. In process block 404, a particular packet switching device is identified. In process block 406, the configuration information (locally or remotely stored) of the particular packet switching device is retrieved. This retrieved configuration information identifies operational details of the packet switching operations performed by (e.g., is performing or is configured to be performed by) the particular packet switching device. In process block 408, the retrieved operational details are analyzed in order to identify one or more network architectural roles being performed by the particular packet switching device. In process block 410, the determined architectural role or roles are stored in a computer-readable medium and/or communicated to an OAM-P/network management system. When there are no more packet switching devices to evaluate, processing is complete as indicated by process block 412.

Figure 5A:
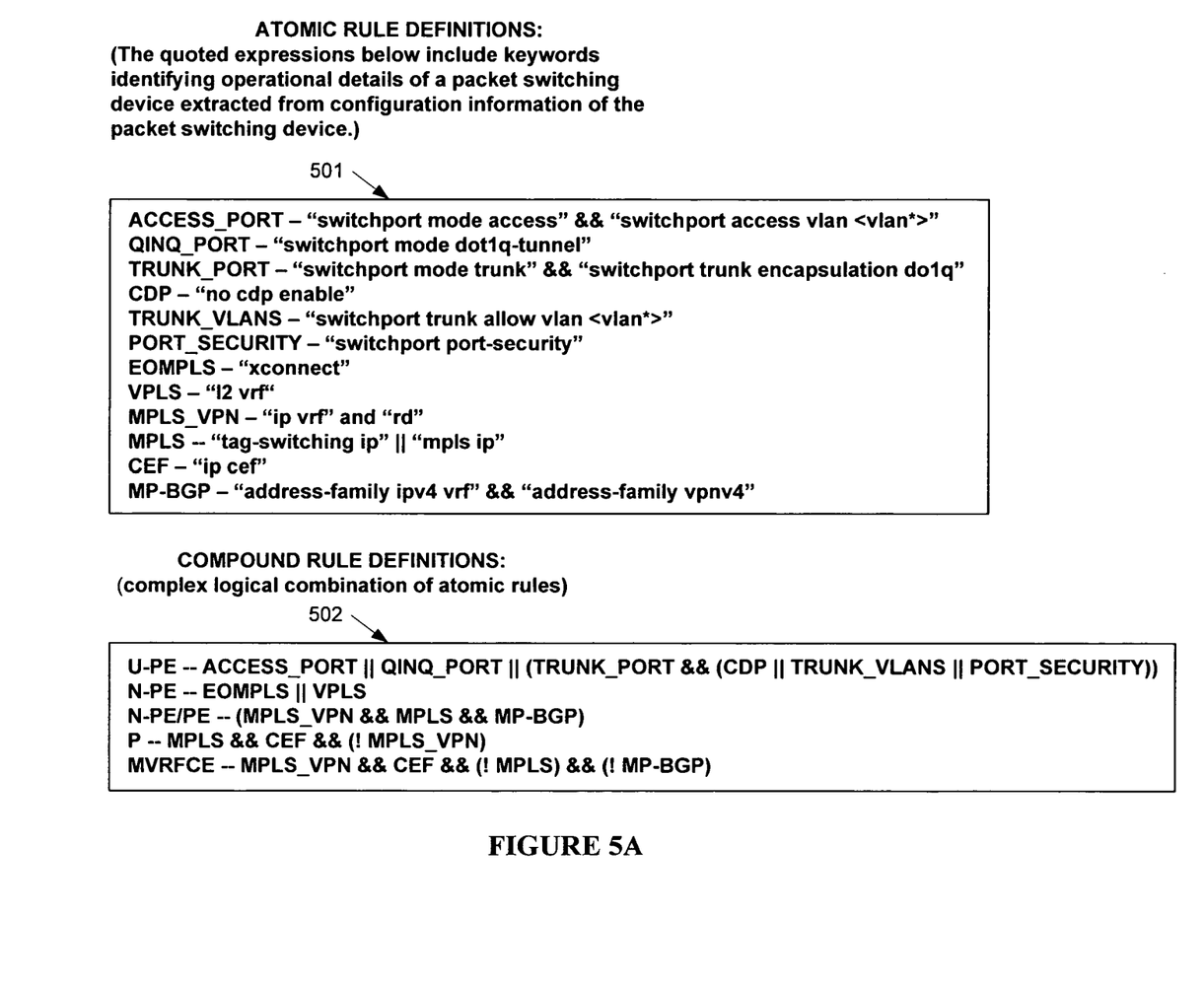
FIG. 5A illustrates a process used in one embodiment for automatically determining an architectural role of a packet switching device.

FIG. 5A illustrates a process used in one embodiment for automatically determining an architectural role of a packet switching device. One process for analyzing the retrieved configuration information is to process the configuration information (e.g., configuration files) based on atomic rules and possibly compound rules. Block 501 illustrates a set of atomic rule definitions and block 502 illustrates a set of compound rule definitions used in one embodiment for identifying an architectural role or multiple architectural roles of a packet switching device. For example, configuration information containing the string "12vrf" will match the "VPLS" atomic rule, which will trigger the compound rule definitions to identify one of the architectural roles as N-PE (network-facing provider edge). Of course, these rules may need to be adapted to match different implementations of packet switching devices, which may use different terminology in their configuration information.

Figure 5B:
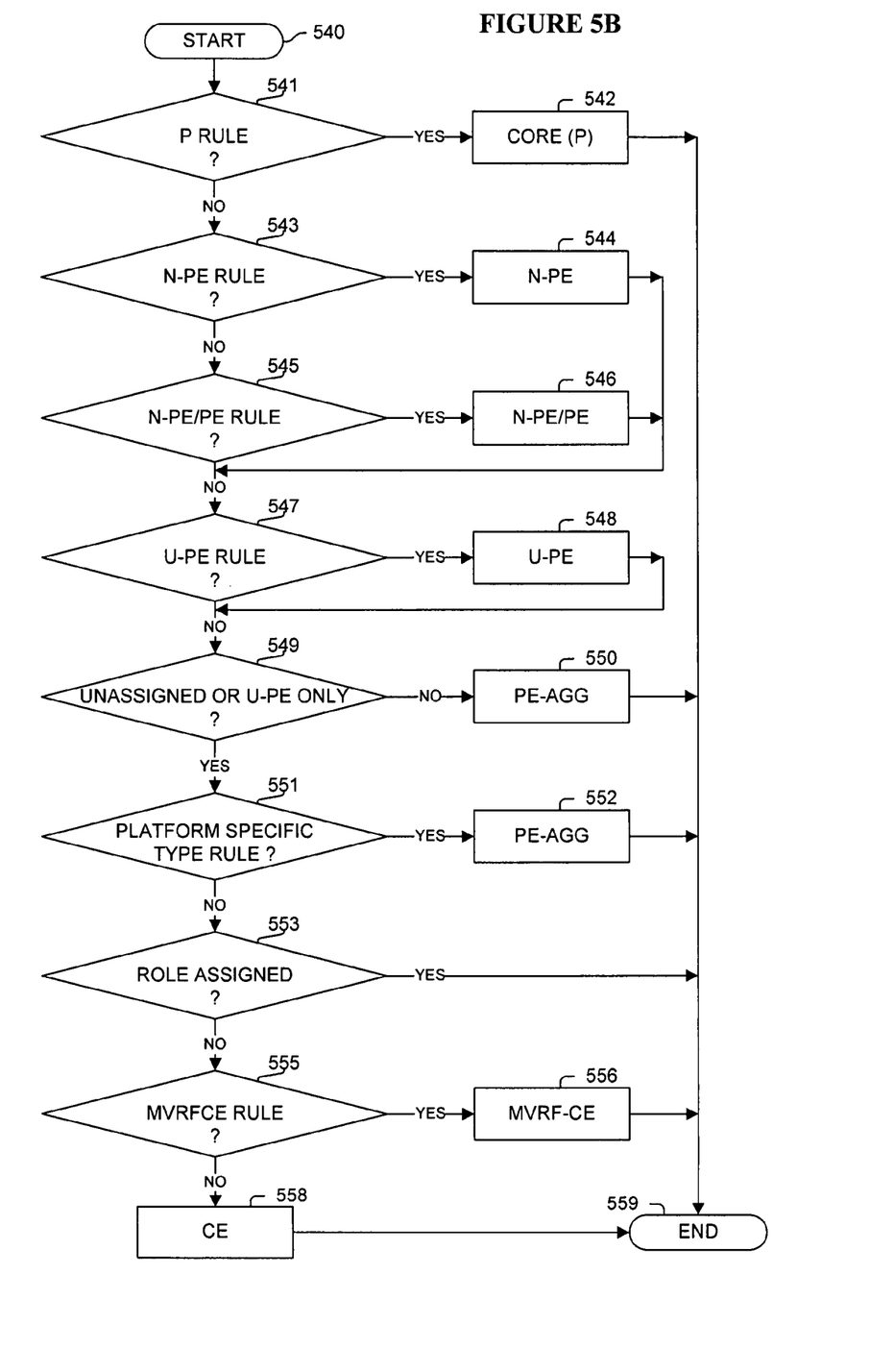
FIG. 5B illustrates a process used in one embodiment for automatically determining an architectural role of a packet switching device.

FIG. 5B illustrates a process used in one embodiment for automatically determining an architectural role of a packet switching device. This flow chart illustrates the determination of one or more architectural roles in a more general sense than that shown in FIG. 5A, as FIG. 5B does not refer to looking for specific strings used in configuration information, rather uses the phrase "rule" to refer to operational details of the configuration information instructing the particular packet switching device to perform some operation. Processing of the flow diagram illustrated in FIG. 5B begins with process block 540.

As determined in process block 541, if there is a P rule (e.g., associated with a core packet switching device), then the sole architectural role of core (P) packet switching device is identified (process block 542); and processing is complete as indicated by process block 559.

Otherwise, as determined in process block 543, if there is an N-PE-only rule (e.g., associated with a network-facing provider edge), then the architectural role of N-PE is identified (process block 544); otherwise, as determined in process block 545, if there is an N-PE/PE rule (e.g., associated with both network-facing provider edge and provider edge functionality), then the architectural role of N-PE/PE is identified (process block 546).

As determined in process block 547, if there is an U-PE rule (e.g., associated with a user-facing provider edge), then the role of U-PE is identified (process block 548).

As determined in process block 549, if there is an architectural role has not yet been determined or only the architectural role of U-PE has been determined, then processing proceeds to process block 551; else the architectural role of PE-AGG (provider edge aggregate) has been determined (process block 550); and processing is complete as indicated by process block 559.

As represented by process block 551, by evaluating the platform type of the packet switching device, the architectural role of PE-AGG (provider edge aggregate) of the packet switching device may be identified (process block 552); and if so, processing is complete as indicated by process block 559. In other words, it may be possible to discover the architectural role that a packet switching device is performing by identifying its hardware and/or software. For example, in one embodiment with a Cisco Metro Ethernet (ME) Release 3.1 Solution, by identifying the device platform as being Catalyst (CAT) 4507, ONS, CAT 6500 or 7600/6500, the architectural role of PE-AGG (provider edge aggregate) has been identified.

As determined in process block 553, if an architectural role has been determined for the packet switching device, then processing is complete as indicated by process block 559.

As determined in process block 555, if there is an MVR-FCE rule, the architectural role of MVRF-CE has been determined (process block 556); otherwise the architectural role of customer edge (CE) packet switching device has been identified (process block 558).

Processing is complete as indicated by process block 559.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A computer-implemented method of automatically discovering network architectural roles of packet switching devices, the method comprising:
   for each particular packet switching device of one or more packet switching devices, a particular machine performing operations including:
      retrieving configuration keywords for said particular packet switching device from one or more configuration files used by said particular packet switching device to configure said particular packet switching device, said retrieved configuration keywords defining packet switching operations to be performed by said particular packet switching device in response to said configuration of said particular packet switching device; and
      determining, based on said retrieved configuration keywords used to configure said particular packet switching device, one or more network architectural roles from a predetermined set of generalized types of network architectural roles to be performed by said particular packet switching device in response to said configuration of said particular packet switching device;
      wherein at least one of said network architectural roles in the predetermined set of generalized types of network architectural roles is a network Building Block.

2. The method of claim 1, wherein said determined one or more network architectural roles include a customer edge device.

3. The method of claim 1, wherein said determined one or more network architectural roles include a provider edge device.

4. The method of claim 1, wherein said determined one or more network architectural roles include a user-facing provider edge device or a network-facing provider edge device.

5. The method of claim 1, wherein said determined one or more network architectural roles include a provider edge aggregation device, a provider core device, or a Multi-VPN routing and forwarding customer edge device.

6. The method of claim 1, wherein said determined one or more network architectural roles for at least one of said one or more packet switching devices include at least two different network architectural roles.

7. The method of claim 6, wherein said at least two different network architectural roles includes a network-facing provider edge device and a user-facing provider edge device.

8. The method of claim 1, comprising tangibly storing in a tangible computer-readable medium a representation of each said determined one or more network architectural role for said each particular packet switching device.

9. The method of claim 1, wherein a metro Ethernet network includes said packet switching devices; and wherein said determining of said one or more network architectural roles for said packet switching devices includes: identification of at least one packet switching device of said packet switching devices as a provider core device, identification of at least one packet switching device of said packet switching devices as a network-facing provider edge device, and identification of at least one packet switching device of said packet switching devices as a user-facing provider edge device.

10. The method of claim 1, wherein a network includes said packet switching devices; and wherein said one or more configuration files used to configure said particular packet switching device are stored remotely in the network from said particular machine.

11. The method of claim 1, wherein said determined one or more network architectural roles include one or more architectural roles from a set of architectural roles including: a customer edge device, a provider edge device, a user-facing provider edge device, and a network-facing provider edge device.

12. The method of claim 1, wherein said one or more configuration files for each of said one or more packet switching devices are stored remotely from said particular machine; and wherein said method includes: retrieving, by the particular machine, said remotely stored configuration files.

13. The method of claim 1, wherein said one or more configuration files used to configure said particular packet switching device are stored locally in said particular packet switching device; and wherein the particular machine is different than said one or more packet switching devices.

14. An apparatus for managing a network, the network including a plurality of packet switching devices, the apparatus comprising one or more processors and a memory, wherein the memory stores one or more instructions that, when executed by the one or more processors, perform operations to automatically discover network architectural roles of each particular packet switching device of the plurality of packet switching devices, said operations for automatically discovering one or more network architectural roles for each said particular packet switching device comprising:
   retrieving configuration keywords for said particular packet switching device from one or more configuration files used by said particular packet switching device to configure said particular packet switching device, said retrieved configuration keywords defining packet switching operations to be performed by said particular packet switching device in response to said configuration of said particular packet switching device; and
   determining, based on said retrieved configuration keywords used to configure said particular packet switching device, one or more network architectural roles from a predetermined set of generalized types of network architectural roles to be performed by said particular packet switching device in response to said configuration of said particular packet switching device;
   wherein at least one of said network architectural roles in the predetermined set of generalized types of network architectural roles is a network Building Block.

15. The apparatus of claim 14, wherein said determined one or more network architectural roles for said particular packet switching device include one or more architectural roles from a set of architectural roles including: a customer edge device, a provider edge device, a user-facing provider edge device, and a network-facing provider edge device.

16. The apparatus of claim 14, wherein said determined one or more network architectural roles for said particular packet switching device include at least one of said one or more packet switching devices include at least two different network architectural roles.

17. The apparatus of claim 16, wherein said at least two different network architectural roles includes a network-facing provider edge device and a user-facing provider edge device.

18. The apparatus of claim 14, wherein said operations include storing said determined one or more network architectural roles for said particular packet switching in a computer-readable medium.

19. The apparatus of claim 14, wherein said determined one or more network architectural roles include a customer edge device.

20. The apparatus of claim 14, wherein said determined one or more network architectural roles include a provider edge device.

21. The apparatus of claim 14, wherein said one or more configuration files for each of said one or more packet switching devices are stored remotely from said particular machine; and wherein the apparatus is configured to retrieve said remotely stored configuration files.

22. The apparatus of claim 14, wherein said one or more configuration files used to configure said particular packet switching device are stored locally in said particular packet switching device; and wherein the particular machine is different than said one or more packet switching devices.

* * * * *